(12) United States Patent
Nishida

(10) Patent No.: US 7,777,467 B2
(45) Date of Patent: Aug. 17, 2010

(54) VOLTAGE RISING/FALLING TYPE SWITCHING REGULATOR AND OPERATION CONTROL METHOD THEREOF

(75) Inventor: Junji Nishida, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 294 days.

(21) Appl. No.: 11/940,020

(22) Filed: Nov. 14, 2007

(65) Prior Publication Data

US 2008/0116869 A1    May 22, 2008

(30) Foreign Application Priority Data

Nov. 21, 2006  (JP)  ............................. 2006-314289

(51) Int. Cl.
*G05F 1/00* (2006.01)
(52) U.S. Cl. ..................................... 323/282
(58) Field of Classification Search ................ 323/244, 323/268, 272, 280–285, 349, 350
See application file for complete search history.

(56) References Cited

U.S. PATENT DOCUMENTS

| | | | | |
|---|---|---|---|---|
| 5,436,550 | A * | 7/1995 | Arakawa | 323/222 |
| 6,420,861 | B2 * | 7/2002 | Ochi et al. | 323/288 |
| 6,674,274 | B2 * | 1/2004 | Hobrecht et al. | 323/285 |
| 7,193,410 | B2 * | 3/2007 | Patel et al. | 324/158.1 |
| 7,253,594 | B2 * | 8/2007 | Paul et al. | 323/268 |
| 7,423,415 | B2 * | 9/2008 | Hasegawa et al. | 323/282 |
| 7,489,118 | B2 * | 2/2009 | Fujii | 323/268 |
| 2003/0034762 | A1 * | 2/2003 | Tateishi | 323/282 |
| 2007/0263617 | A1 * | 11/2007 | Takemura | 370/360 |

FOREIGN PATENT DOCUMENTS

| | | |
|---|---|---|
| JP | 6-70486 | 9/1994 |
| JP | 2003-125576 | 4/2003 |
| JP | 2004-208448 | 7/2004 |
| JP | 2005-57954 | 3/2005 |
| JP | 2006-293404 | 10/2006 |

OTHER PUBLICATIONS

Oct. 14, 2009 Korean official action (and English translation thereof) in connection with a counterpart Korean patent application No. 10-2007-0118453.

* cited by examiner

*Primary Examiner*—Adolf Berhane
*Assistant Examiner*—Yemane Mehari
(74) *Attorney, Agent, or Firm*—Cooper & Dunham LLP

(57) ABSTRACT

In a voltage rising/falling type switching regulator including a voltage rising/falling part and a control part, the voltage rising/falling part includes a switching transistor for voltage falling, a rectifier element for voltage falling, a switching transistor for voltage rising, and a rectifier element for voltage rising, the control part is arranged so that the switching transistor for voltage rising and the switching transistor for voltage falling are synchronized at a time of shifting from voltage rising operation to voltage falling operation and/or at a time of shifting from voltage falling operation to voltage rising operation, to perform voltage rising/falling operation in which each switching transistor is turned on in a 50% duty cycle.

19 Claims, 6 Drawing Sheets

US 7,777,467 B2

VOLTAGE RISING/FALLING TYPE SWITCHING REGULATOR AND OPERATION CONTROL METHOD THEREOF

BACKGROUND

1. Technical Field

This disclosure relates to a voltage rising/falling type switching regulator and its operation control method in which voltage rising/falling operations are switched automatically, and more particularly to operation of a switching regulator at a time of switching voltage rising operation and voltage falling operation.

2. Description of the Related Art

FIG. 6 shows a voltage rising/falling type switching regulator according to the related art (for example, Japanese Laid-Open Utility Model Application No. 6-70486). FIG. 7 shows the relationship between input voltage Vi and output voltage Vo in the voltage rising/falling type switching regulator of FIG. 6.

In the voltage rising/falling type switching regulator of FIG. 6, at a time of voltage falling operation, a voltage falling control circuit 101 controls the on-duty cycle of a pulse inputted to the base of a switching transistor Q101 for voltage falling, so that a division voltage Vs is set to a reference voltage (Vref1+Vref2). And at a time of voltage rising operation, a voltage rising control circuit 102 controls the on-duty cycle of a pulse inputted to the base of a switching transistor Q102 for voltage rising, so that the division voltage Vs is set to a reference voltage Vref2.

As shown in FIG. 7, in the region where the input voltage Vi is relatively small and the voltage rising operation is performed, the output voltage Vo is set to a voltage Vo1, and in the region where the input voltage Vi is relatively large and the voltage falling operation is performed, the output voltage Vo is set to a voltage Vo2 larger than the voltage Vo1. On the other hand, when the input voltage Vi falls within a region where the output voltage Vo is in a range between the voltage Vo1 and the voltage Vo2, the non-control state in which neither the voltage rising operation nor the voltage falling operation is performed takes place.

There is known an operation control method of a switching regulator according to the related art (for example, Japanese Laid-Open Patent Application No. 2005-57954). According to this operation control method, only one of an output of a PWM comparator for voltage falling control and an output of a PWM comparator for voltage rising control is used so that voltage rising operation and voltage falling operation may not occur simultaneously.

Moreover, according to the above method, the resistance for shifting the level of an output voltage of an error amplifying circuit is finely adjusted to avoid occurrence of the non-control state, and the setting is performed so that switching between voltage rising operation and voltage falling operation is performed instantaneously.

There is known another operation control method of a switching regulator according to the related art (for example, Japanese Laid-Open Patent Application No. 2003-125576). According to this method, a switching frequency is made large for a region where the input voltage and the output voltage are near to each other, and the difference in the power loss between at the time of shifting from voltage rising operation to the non-control state and at the time of shifting from the non-control state to voltage falling operation is made small, so as to attain smooth operation shifting.

However, the switching regulator of Japanese Laid-Open Utility Model Application No. 6-70486 has a problem in that when the switching regulator is in the non-control state, both the switching transistor for voltage falling and the switching transistor for voltage rising stop operation, and the power conversion efficiency improves. However, at the time of shifting from voltage falling operation or voltage rising operation to the non-control state, or at the time of shifting from the non-control state to voltage falling operation or voltage rising operation, the power loss changes abruptly and the output voltage Vo fluctuates sharply. Moreover, in order to provide the non-control state, it is necessary to carry out the setting so that the output voltage value Vo1 at the time of voltage rising operation is smaller than the output voltage value Vo2 at the time of voltage falling operation. Whenever switching between voltage rising operation and voltage falling operation is performed, the sharp fluctuation of the output voltage will occur.

The operation control method of Japanese Laid-Open Patent Application No. 2005-57954 requires precise adjustment of the resistance in order to shift the level of the output voltage of the error amplifying circuit. If the adjustment of the resistance deviates, the non-control state will occur. To avoid this, it is necessary that temperature characteristics of the adjusted resistor are in conformity with temperature characteristics of the circuit which sets up the level of a triangular wave oscillating circuit, to raise the adjustment accuracy. Thus, there is a problem that the cost for the adjustment of the resistance increases.

In the operation control method of Japanese Laid-Open Patent Application No. 2003-125576, the clock frequency of the converter changes according to the input voltage, and it is likely that noises occur over a wide range of frequencies. Thus, the operation control method is not appropriate for use in power supplies of wireless communication devices or the like.

SUMMARY

According to an aspect of this disclosure, there is provided an improved voltage rising/falling type switching regulator and its operation control method in which the above-described problems are eliminated.

According to another aspect of this disclosure, there is provided a voltage rising/falling type switching regulator and its operation control method which is capable of reducing effectively the fluctuation of the output voltage at the time of switching between voltage falling operation and voltage rising operation, without causing the non-control state to occur.

In an embodiment, there is provided a voltage rising/falling type switching regulator including a voltage rising/falling part lowering or raising an input voltage inputted from an input terminal in accordance with an inputted control signal, using an inductor, to output the resulting voltage from an output terminal, and a control part causing the voltage rising/falling part to perform voltage rising operation or voltage falling operation in response to a voltage difference between a proportional voltage which is proportional to the output voltage received from the voltage rising/falling part, and a predetermined reference voltage, the voltage rising/falling part comprising: a switching transistor for voltage falling which is turned on and off according to the inputted control signal to charge the inductor by the input voltage during voltage falling operation; a rectifier element for voltage falling which discharges the inductor during voltage falling operation; a switching transistor for voltage rising which is turned on and off according to the inputted control signal to charge the inductor by the input voltage during voltage rising operation; and a rectifier element for voltage rising which discharges the inductor during voltage rising operation, wherein the control part is arranged so that the switching transistor for voltage rising and the switching transistor for voltage falling are synchronized at a time of shifting from voltage rising operation to voltage falling operation and/or at a time of shifting from voltage falling operation to voltage rising operation, to perform voltage rising/falling operation in which each switching transistor is turned on in a 50% duty cycle.

The above-mentioned voltage rising/falling type switching regulator may be configured so that the control part comprises: an error amplifying circuit part amplifying the voltage difference between the proportional voltage and the reference voltage to output an output signal indicating the amplified voltage difference; an oscillating circuit part generating one of a triangular wave signal for voltage falling operation, a triangular wave signal for voltage rising operation, and a triangular wave signal for voltage rising/falling operation in response to the inputted control signal; a voltage comparing circuit part performing a voltage comparison of the output signal received from the error amplifying circuit part and the triangular wave signal received from the oscillating circuit part, to output a binary signal indicating the comparison result; an output control circuit part controlling switching of the switching transistor for voltage falling and the switching transistor for voltage rising, in accordance with the binary signal received from the voltage comparing circuit part, wherein the output control circuit part is arranged to cause the oscillating circuit part to generate a predetermined triangular wave signal according to operation, thereby causing the voltage rising/falling part to perform one of voltage falling operation, voltage rising operation, and voltage rising/falling operation.

The above-mentioned voltage rising/falling type switching regulator may be configured so that the oscillating circuit part is arranged so that an amplitude of the triangular wave signal for voltage falling operation is larger than an amplitude of the triangular wave signal for voltage rising operation, an upper limit voltage of the triangular wave signal for voltage falling operation and a lower limit voltage of the triangular wave signal for voltage rising operation are equal to each other, a lower limit voltage of the triangular wave signal for voltage rising/falling operation and a lower limit voltage of the triangular wave signal for voltage falling operation are equal to each other, an upper limit voltage of the triangular wave signal for voltage rising/falling operation and an upper limit voltage of the triangular wave signal for voltage rising operation are equal to each other, and each of the triangular wave signal for voltage falling operation, the triangular wave signal for voltage rising operation, and the triangular wave signal for voltage rising/falling operation has a same period.

The above-mentioned voltage rising/falling type switching regulator may be configured so that the control part is arranged to include an integrating circuit part which integrates a control signal outputted to a control electrode of the switching transistor for voltage falling by the output control circuit part, to generate a first integration signal, and integrates a control signal outputted to a control electrode of the switching transistor for voltage rising by the output control circuit part, to generate a second integration signal, the integrating circuit part outputting the first integration signal and the second integration signal to the output control circuit part, respectively, and the output control circuit part is arranged to cause the oscillating circuit part to output one of the triangular wave signal for voltage falling operation, the triangular wave signal for voltage rising operation, and the triangular wave signal for voltage rising/falling operation in accordance with the first integration signal and the second integration signal received from the integrating circuit part.

The above-mentioned voltage rising/falling type switching regulator may be configured so that, when it is detected from the first integration signal that an on-duty cycle of the switching transistor for voltage falling is 100%, the output control circuit part causes the voltage rising/falling part to perform the voltage rising/falling operation.

The above-mentioned voltage rising/falling type switching regulator may be configured so that, when it is detected from the second integration signal that an on-duty cycle of the switching transistor for voltage rising is 0%, the output control circuit part causes the voltage rising/falling part to perform the voltage rising/falling operation.

The above-mentioned voltage rising/falling type switching regulator may be configured so that, after a predetermined period has elapsed from a time the voltage rising/falling part is caused to start the voltage rising/falling operation, the output control circuit part causes the voltage rising/falling part to terminate the voltage rising/falling operation and perform a following operation.

The above-mentioned voltage rising/falling type switching regulator may be configured so that, when it is detected that voltages of the first integration signal and the second integration signal received from the integrating circuit part are equal to each other, the output control circuit part causes the voltage rising/falling part to terminate the voltage rising/falling operation and perform a following operation.

The above-mentioned voltage rising/falling type switching regulator may be configured so that, when it is detected from the first integration signal and the second integration signal, received from the integrating circuit part, that an on-duty cycle of each of the control signal inputted to the control electrode of the switching transistor for voltage falling and the control signal inputted to the control electrode of the switching transistor for voltage rising is above 50% respectively, the output control circuit part causes the voltage rising/falling part to perform the voltage rising operation.

The above-mentioned voltage rising/falling type switching regulator may be configured so that, when it is detected from the first integration signal and the second integration signal, received from the integrating circuit part, that an on-duty cycle of each of the control signal inputted to the control electrode of the switching transistor for voltage falling and the control signal inputted to the control electrode of the switching transistor for voltage rising is below 50% respectively, the output control circuit part causes the voltage rising/falling part to perform the voltage falling operation.

The above-mentioned voltage rising/falling type switching regulator may be configured so that each triangular wave signal is a sawtooth signal.

The above-mentioned voltage rising/falling type switching regulator may be configured so that the switching transistor for voltage falling, the rectifier element for voltage falling, the switching transistor for voltage rising, the rectifier element for voltage rising, and the control part are integrated on a single IC.

In another embodiment, there is provided an operation control method of a voltage rising/falling type switching regulator, the method comprising the steps of: performing operation control of a switching transistor for voltage falling which is turned on and off according to an inputted control signal to charge an inductor by an input voltage during voltage falling operation, and a switching transistor for voltage rising which is turned on and off according to the control signal to charge the inductor by the input voltage during voltage rising operation, in order to lower or raise an input voltage in accordance with the control signal to output the resulting voltage as an output voltage; and synchronizing the switching transistor for voltage rising and the switching transistor for voltage falling at a time of shifting from voltage rising operation to voltage falling operation and/or at a time of shifting from voltage falling operation to voltage rising operation, to perform voltage rising/falling operation in which each switching transistor is turned on in a 50% duty cycle.

The above-mentioned operation control method may be configured so that switching of the switching transistor for voltage falling and the switching transistor for voltage rising is controlled in accordance with a result of a voltage comparison of a binary signal indicating an amplified voltage difference between a proportional voltage proportional to the output voltage and a predetermined reference voltage, and one of a triangular wave signal for voltage falling operation, a triangular wave signal for voltage rising operation, and a triangular wave signal for voltage rising/falling operation, generated in response to the control signal, and an amplitude of the triangular wave signal for voltage falling operation is larger than an amplitude of the triangular wave signal for voltage rising operation, an upper limit voltage of the triangular wave signal for voltage falling operation and a lower limit voltage of the triangular wave signal for voltage rising operation are equal to each other, a lower limit voltage of the triangular wave signal for voltage rising/falling operation and a lower limit voltage of the triangular wave signal for voltage falling operation are equal to each other, an upper limit voltage of the triangular wave signal for voltage rising/falling operation and an upper limit voltage of the triangular wave signal for voltage rising operation are equal to each other, and each of the triangular wave signal for voltage falling operation, the triangular wave signal for voltage rising operation, and the triangular wave signal for voltage rising/falling operation has a same period.

The above-mentioned operation control method may be configured so that a control signal supplied to a control electrode of the switching transistor for voltage falling is integrated to generate a first integration signal, a control signal supplied to a control electrode of the switching transistor for voltage rising is integrated to generate a second integration signal, and one of the triangular wave signal for voltage falling operation, the triangular wave signal for voltage rising operation, and the triangular wave signal for voltage rising/falling operation is outputted in accordance with the first integration signal and the second integration signal.

The above-mentioned operation control method may be configured so that, when it is detected from the first integration signal that an on-duty cycle of the switching transistor for voltage falling is 100%, the voltage rising/falling operation is performed.

The above-mentioned operation control method may be configured so that, when it is detected from the second integration signal that an on-duty cycle of the switching transistor for voltage rising is 0%, the voltage rising/falling operation is performed.

The above-mentioned operation control method may be configured so that, after a predetermined period has elapsed from a time the voltage rising/falling operation is started, the voltage rising/falling operation is terminated and a following operation is performed.

The above-mentioned operation control method may be configured so that, when it is detected that voltages of the first integration signal and the second integration signal are equal to each other, the voltage rising/falling operation is terminated and a following operation is performed.

The above-mentioned operation control method may be configured so that, when it is detected from the first integration signal and the second integration signal that an on-duty cycle of each of the control signal inputted to the control electrode of the switching transistor for voltage falling and the control signal inputted to the control electrode of the switching transistor for voltage rising is above 50% respectively, the voltage rising operation is performed.

The above-mentioned operation control method may be configured so that, when it is detected from the first integration signal and the second integration signal that an on-duty cycle of each of the control signal inputted to the control electrode of the switching transistor for voltage falling and the control signal inputted to the control electrode of the switching transistor for voltage rising is below 50% respectively, the voltage falling operation is performed.

The above-mentioned operation control method may be configured so that each triangular wave signal is a sawtooth signal.

According to embodiments of the aforementioned voltage rising/falling type switching regulator and operation control method, at the time of shifting from voltage rising operation to voltage falling operation and/or at the time of shifting from voltage falling operation to voltage rising operation, the switching transistor for voltage rising and the switching transistor for voltage falling are synchronized and a voltage rising/falling operation which is turned on in a 50% duty cycle is performed. Accordingly, without causing the non-control state to occur, it is possible to reduce effectively the fluctuation of the output voltage at the time of switching between voltage falling operation and voltage rising operation. Since the frequency of each of the triangular wave signal for voltage falling operation, the triangular wave signal for voltage rising operation and triangular wave signal for voltage rising/falling operation is constant, it is possible to avoid the occurrence of noises in various frequency bands.

BRIEF DESCRIPTION OF THE DRAWINGS

Other aspects, features and advantages will be apparent from the following detailed description when reading in conjunction with the accompanying drawings.

DETAILED DESCRIPTION OF PREFERRED EMBODIMENTS

A description will be given of embodiments of the invention with reference to the accompanying drawings.

Figure 1:
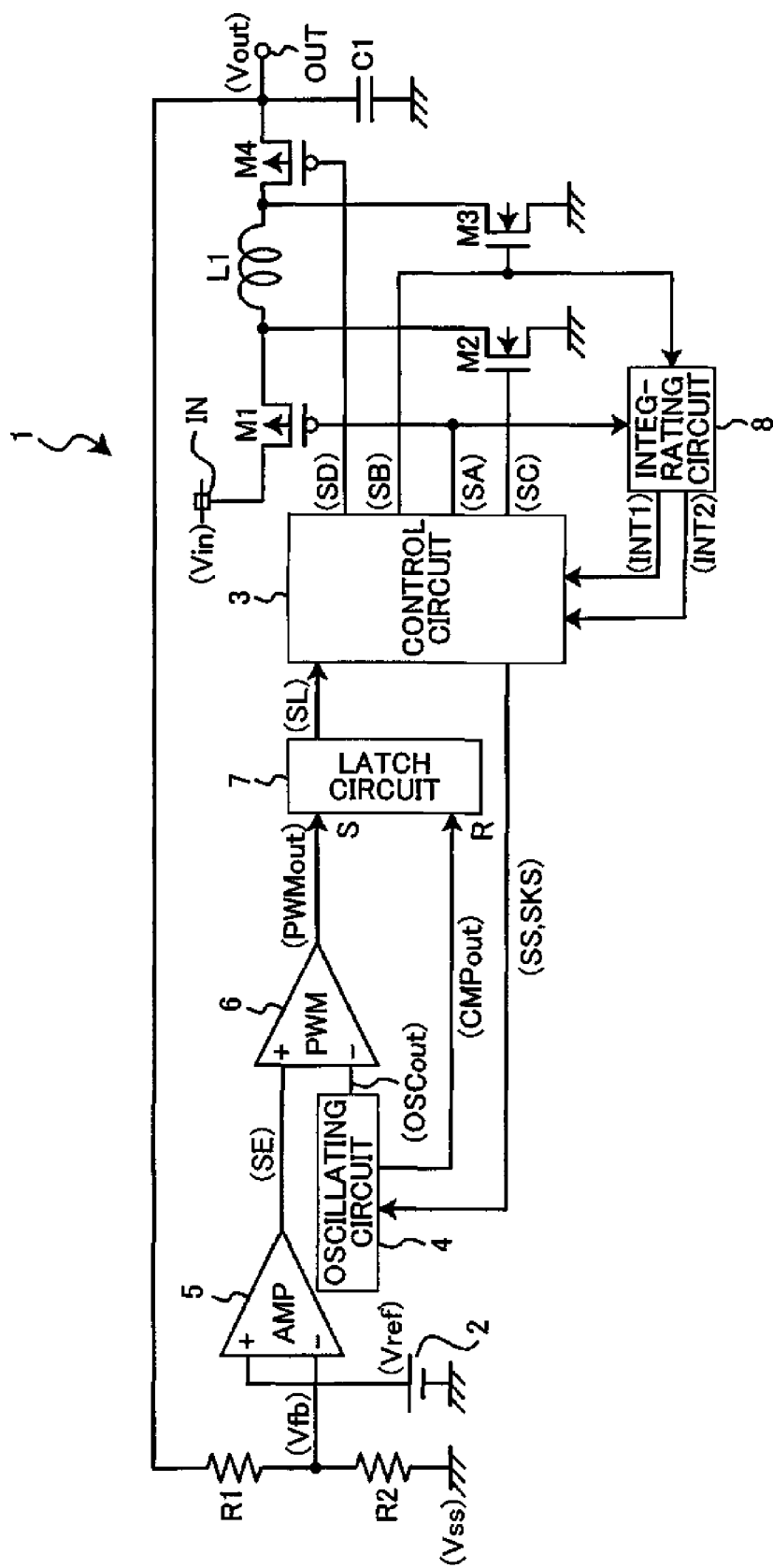
FIG. 1 is a diagram showing the circuit composition of a voltage rising/falling type switching regulator in an embodiment of the invention.

FIG. 1 shows the circuit composition of a voltage rising/falling type switching regulator in an embodiment of the invention. The voltage rising/falling type switching regulator 1, shown in FIG. 1, is a switching regulator of synchronous rectification type which automatically raises or lowers an input voltage Vin, inputted to an input terminal IN, and converts the input voltage Vin to a predetermined constant voltage, to output the constant voltage from an output terminal OUT as an output voltage Vout.

The voltage rising/falling type switching regulator 1 includes a switching transistor M1 for voltage falling, a synchronous rectification transistor M2 for voltage falling, a switching transistor M3 for voltage rising, and a synchronous rectification transistor M4 for voltage rising. The switching transistor M1 for voltage falling is formed by a PMOS transistor which performs switching to charge an inductor L1 (which will be mentioned later) at the time of voltage falling operation. The synchronous rectification transistor M2 for voltage falling is formed by an NMOS transistor which serves as a transistor for synchronous rectification at the time of voltage falling operation. The switching transistor M3 for voltage rising is formed by an NMOS transistor which performs switching to charge the inductor L1 (which will be mentioned later) at the time of voltage rising operation. The synchronous rectification transistor M4 for voltage rising is formed by a PMOS transistor which serves as a transistor for synchronous rectification at the time of voltage rising operation.

Moreover, the voltage rising/falling type switching regulator 1 includes a reference voltage generating circuit 2, a control circuit 3, an oscillating circuit 4, an error amplifying circuit 5, a PWM comparator 6, a latch circuit 7, an integrating circuit 8, an inductor L1, a capacitor C1, and resistors R1, R2. The reference voltage generating circuit 2 generates and outputs a predetermined reference voltage Vref. The control circuit 3 controls switching of the switching transistor M1 for voltage falling, the synchronous rectification transistor M2 for voltage falling, the switching transistor M3 for voltage rising, and the synchronous rectification transistor M4 for voltage rising. The oscillating circuit 4 generates and outputs a sawtooth signal OSCout according to an inputted control signal. The latch circuit 7 serves as an RS flip-flop. The resistors R1 and R2 are provided for output voltage detection and generate a division voltage Vfb at the connection point of the resistors R1 and R2 from the output voltage Vout.

Although the illustration in the composition of FIG. 1 is omitted, the reference voltage generating circuit 2, the control circuit 3, the oscillating circuit 4, the error amplifying circuit 5, the PWM comparator 6, the latch circuit 7, and the integrating circuit 8 operate by using the input voltage Vin as the power supply.

The switching transistor M1 for voltage falling, the synchronous rectification transistor M2 for voltage falling, the switching transistor M3 for voltage rising, the synchronous rectification transistor M4 for voltage rising, the inductor L1, and the capacitor C1 constitute the voltage rising/falling part in the claims. The reference voltage generating circuit 2, the control circuit 3, the oscillating circuit 4, the error amplifying circuit 5, the PWM comparator 6, the latch circuit 7, the integrating circuit 8, and the resistors R1, R2 constitute the control part in the claims.

Moreover, the synchronous rectification transistor M2 for voltage falling constitutes the rectifier element for voltage falling in the claims. The synchronous rectification transistor M4 for voltage rising constitutes the rectifier element for voltage rising in the claims. The oscillating circuit 4 constitutes the oscillating circuit part in the claims. The error amplifying circuit 5 constitutes the error amplifying circuit part in the claims. The PWM comparator 6 constitutes the voltage comparing circuit part in the claims. The integrating circuit 8 constitutes the integrating circuit part in the claims. The control circuit 3 and the latch circuit 7 constitute the output control circuit part in the claims.

The respective circuit components of the voltage rising/falling type switching regulator 1 of FIG. 1, except the inductor L1 and the capacitor C1, may be integrated on a single IC. Moreover, in some cases, the respective circuit components of the voltage rising/falling type switching regulator 1 of FIG. 1, except at least one of the transistors M1-M4, the inductor L1 and the capacitor C1, may be integrated on a single IC.

The switching transistor M1 for voltage falling and the synchronous rectification transistor M2 for voltage falling are connected in series between the input voltage Vin and the ground voltage Vss. The inductor L1 and the synchronous rectification transistor M4 for voltage rising are connected in series between the connection point of the switching transistor M1 for voltage falling and the synchronous rectification transistor M2 for voltage falling, and the output terminal OUT. The switching transistor M3 for voltage rising is connected between the connection point of the inductor L1 and the synchronous rectification transistor M4 for voltage rising, and the ground voltage Vss. The capacitor C1 is connected between the output terminal OUT and the ground voltage Vss, and the resistors R1 and R2 are connected in series between the output terminal OUT and the ground voltage Vss. The division voltage Vfb is outputted from the connection point of the resistors R1 and R2.

In the error amplifying circuit 5, the division voltage Vfb is inputted to its inverted input terminal, and the reference voltage Vref is inputted to its non-inverted input terminal. The output terminal of the error amplifying circuit 5 is connected to the non-inverted input terminal of the PWM comparator 6, and the sawtooth signal OSCout outputted from the oscillating circuit 4 is inputted to the inverted input terminal of the PWM comparator 6.

The PWM comparator 6 performs a voltage comparison of the error signal SE (which is outputted from the error amplifying circuit 5) and the sawtooth signal OSCout. When a match in voltage between the two signals occurs, the PWM comparator 6 generates a pulse signal PWMout which sets the latch circuit 7, and outputs the pulse signal PWMout to the setting terminal S of the latch circuit 7.

The oscillating circuit 4 generates a pulse signal CMPout which is synchronized with a falling of the sawtooth signal OSCout, and outputs the pulse signal CMPout to the resetting terminal R of the latch circuit 7. The latch circuit 7 is reset by this pulse signal CMPout. Thus, the PWM signal SL which is a pulse signal subjected to pulse width modulation (PWM) is outputted from the latch circuit 7 to the control circuit 3.

The control circuit 3 controls switching of the switching transistor M1 for voltage falling and the synchronous rectification transistor M2 for voltage falling based on the PWM signal SL received from the latch circuit 7, so that the control circuit 3 performs complementary switching on/off operation of the transistors M1 and M2. At the same time, the control circuit 3 controls switching of the switching transistor M3 for voltage rising and the synchronous rectification transistor M4 for voltage rising based on the PWM signal SL received from the latch circuit 7, so that the control circuit 3 performs complementary switching on/off operation of the transistors M3 and M4.

On the other hand, the control signal SA outputted from the control circuit 3 to the gate of the switching transistor M1 for voltage falling, and the control signal SB outputted from the control circuit 3 to the gate of the switching transistor M3 for voltage rising are inputted to the integrating circuit 8, respectively. The integrating circuit 8 integrates an inverted control signal in which the signal level of the control signal SA is inverted, to generate a first integration signal INT1. And the integrating circuit 8 integrates the control signal SB to generate a second integration signal INT2. The integrating circuit 8 outputs these integration signals INT1 and INT2 to the control circuit 3, respectively.

The control circuit 3 generates a voltage rising/falling signal SKS and a voltage rising signal SS, which are control signals for controlling operation of the oscillating circuit 4, based on the received first integration signal INT1 and the received second integration signal INT2, respectively. And the control circuit 3 outputs these control signals SKS and SS to the oscillating circuit 4.

Figure 2:
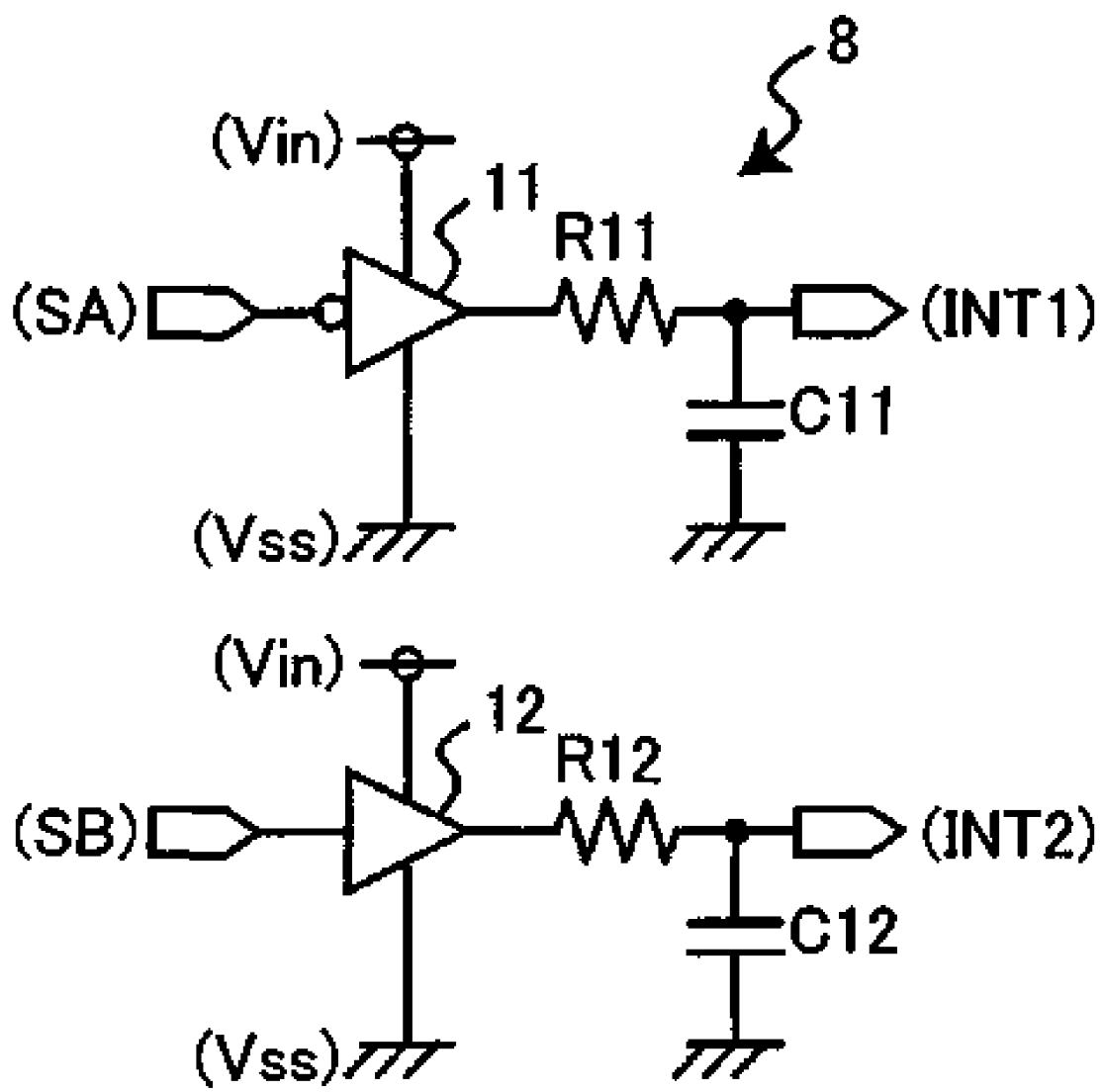
FIG. 2 is a diagram showing the circuit composition of an integrating circuit in the voltage rising/falling type switching regulator of FIG. 1.

FIG. 2 shows the circuit composition of an integrating circuit 8 in the voltage rising/falling type switching regulator of FIG. 1. The integrating circuit 8, shown in FIG. 2, includes an inverter 11, a buffer 12, capacitors C11, C12, and resistors R11 and R12.

The control signal SA is inputted to the input terminal of the inverter 11, and the control signal SB is inputted to the input terminal of the buffer 12, respectively. The capacitor C11 and the resistor R11 are connected in series between the output terminal of the inverter 11 and the ground voltage Vss. The capacitor C12 and the resistor R12 are connected with in series between the output terminal of the buffer 12 and the ground voltage Vss.

The signal level of the control signal SA is inverted by the inverter 11, and charging and discharging of the capacitor C11 is performed through the resistor R11. Charging and discharging of the capacitor C12 is performed by the control signal SB through the buffer 12 and the resistor R12.

The first integration signal INT1 is outputted from the connection point of the resistor R11 and the capacitor C11, and the second integration signal INT2 is outputted from the connection point of the resistor R12 and the capacitor C12, respectively. The time constant of the resistor R11 and the capacitor C11 and the time constant of the resistor R12 and the capacitor C12 are set to appropriate values respectively in accordance with the frequency of the sawtooth signal OSCout outputted from the oscillating circuit 4.

The oscillating circuit 4 generates and outputs one of a sawtooth signal OSCout for voltage rising operation, a sawtooth signal OSCout for voltage falling operation and a sawtooth signal OSCout for voltage rising/falling operation in accordance with the voltage rising/falling signal SKS and the voltage rising signal SS received from the control circuit 3. In this case, the sawtooth signal OSCout for voltage falling operation and the sawtooth signal OSCout for voltage rising operation have the same amplitude. The upper limit voltage of the sawtooth signal OSCout for voltage falling operation and the lower limit voltage of the sawtooth signal OSCout for voltage rising operation are almost equal to each other. The lower limit voltage of the sawtooth signal OSCout for voltage rising/falling operation and the lower limit voltage of the sawtooth signal OSCout for voltage falling operation are equal to each other, and the upper limit voltage of the sawtooth signal OSCout for voltage rising/falling operation and the upper limit voltage of the sawtooth signal OSCout for voltage rising operation are equal to each other. Moreover, each of the sawtooth signal OSCout for voltage rising operation, the sawtooth signal OSCout for voltage falling operation, and the sawtooth signal OSCout for voltage rising/falling operation has the same period.

Figure 3:
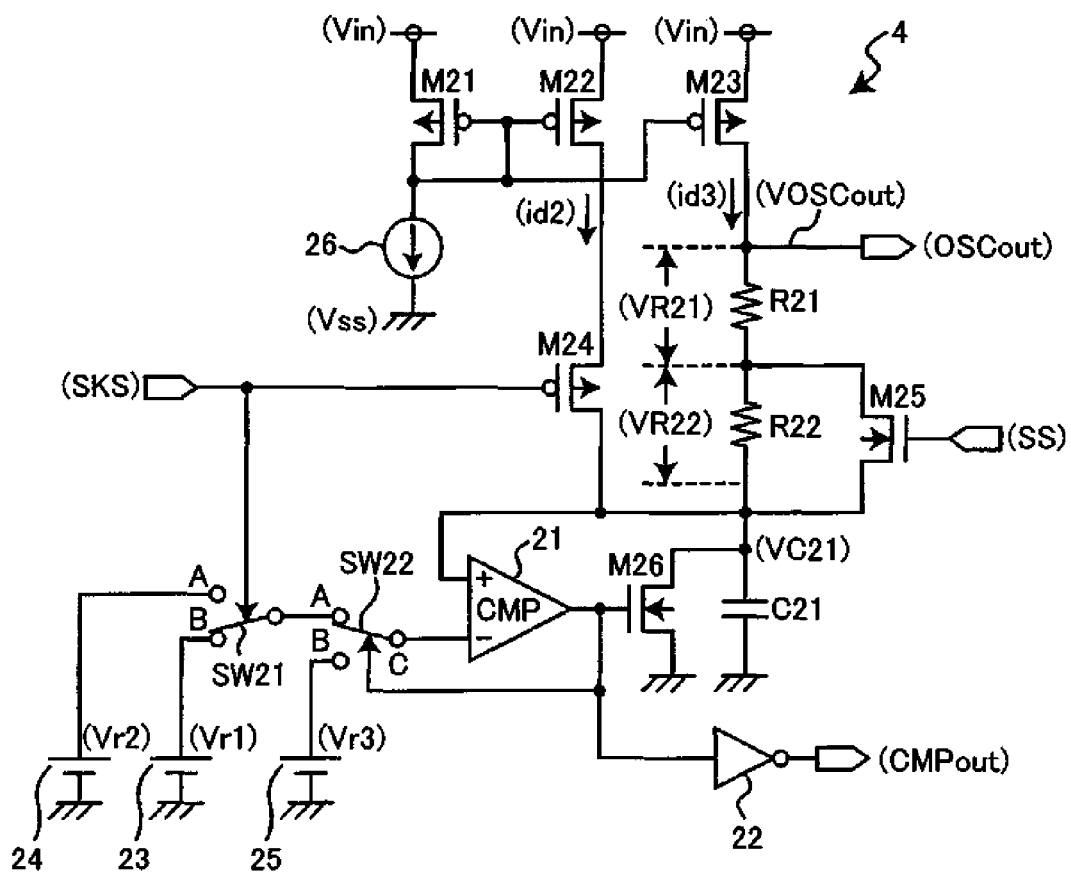
FIG. 3 is a diagram showing the circuit composition of an oscillating circuit in the voltage rising/falling type switching regulator of FIG. 1.

FIG. 3 shows the circuit composition of an oscillating circuit 4 in the voltage rising/falling type switching regulator 1 of FIG. 1. The oscillating circuit 4, shown in FIG. 3, includes a comparator 21, PMOS transistors M21-M24, NMOS transistors M25, M26, an inverter 22, a first reference voltage generating circuit 23 generating and outputting a predetermined reference-voltage Vr1, a second reference voltage generating circuit 24 generating and outputting a predetermined reference voltage Vr2, a third reference voltage generating circuit 25 generating and outputting a predetermined reference voltage Vr3, a current source 26, switches SW21, SW22 having a control signal input terminal respectively, resistors R21, R22, and a capacitor C21.

The source of the PMOS transistor M21 is connected to the input voltage Vin, and the current source 26 is connected between the drain of the PMOS transistor M21 and the ground voltage Vss. The PMOS transistors M21-M23 form the current mirror circuit, the respective gates of the PMOS transistors M21-M23 are connected together, and the corresponding connection point is connected to the drain of the PMOS transistor M21.

Each of the sources of the PMOS transistors M22 and M23 is connected to the input voltage Vin. The drain current id2 of the PMOS transistor M22 and the drain current id3 of the PMOS transistor M23 are set to a current value which is proportional to the current value of the current source 26, respectively.

In the composition of FIG. 3, the transistor with the same characteristics is used for each of the PMOS transistors M22 and M23, and the drain current id2 and the drain current id3 are set to the same current value.

The resistor R21, the resistor R22, and the capacitor C21 are connected in series between the drain of the PMOS transistor M23 and the ground voltage Vss, and the NMOS transistor M25 and the resistor R22 are connected in parallel. The sawtooth signal OSCout is outputted from the connection point of the PMOS transistor M23 and the resistor R21.

The PMOS transistor M24 is connected between the drain of the PMOS transistor M22 and the connection point of the resistor R22 and the capacitor C21. The voltage rising/falling signal SKS is inputted to the gate of the PMOS transistor M24, and the voltage rising signal SS is inputted to the gate of the PMOS transistor M25, respectively.

The NMOS transistor M26 and the capacitor C21 are connected in parallel, and the gate of the NMOS transistor M26 is connected to the output terminal of the comparator 21.

The non-inverted input terminal of the comparator 21 is connected to the connection point of the resistor R22 and the capacitor C21. The signal level of the output signal of the comparator 21 is inverted by the inverter 22, and the resulting signal is outputted as the pulse signal CMPout. And this pulse signal CMPout is outputted to the control input terminal of the switch SW22.

The reference voltage Vr2 is inputted to the terminal A of the switch SW21, and the reference voltage Vr1 is inputted to the terminal B of the switch SW21, respectively, and the voltage rising/falling signal SKS is inputted to the control input terminal of the switch SW21. The common terminal C of the switch SW21 is connected to the terminal A of the switch SW22. The reference voltage Vr3 is inputted to the terminal B of the switch SW22, and the common terminal C of the switch SW22 is connected to the inverted input terminal of the comparator 21.

Each amplitude of the sawtooth signal OSCout for voltage falling operation and the sawtooth signal OSCout for voltage rising operation is set up in accordance with the reference voltage Vr1, respectively, and the amplitude of the sawtooth signal OSCout for voltage rising/falling operation is set up in accordance with the reference voltage Vr2. The reference voltage Vr3 is set to a voltage value that is near the ground voltage Vss, and this reference voltage Vr3 is used for detect whether the electric charge of the capacitor C21 is discharged.

At the time of voltage falling operation, both the voltage rising signal SS and the voltage rising/falling signal SKS are set to HIGH level. When the voltage rising signal SS is set to HIGH level, the NMOS transistor M25 is turned on and set in conduction state to short-circuit the resistor R22.

When the voltage rising/falling signal SKS is set to HIGH level, the common terminal C is connected to the terminal B of the switch SW21, and the PMOS transistor M24 is turned off and set in non-conduction state.

When the output signal of the comparator 21 is set to LOW level in the above-mentioned state, the common terminal C is connected to the terminal A of the switch SW22 and the reference voltage Vr1 is inputted to the inverted input terminal of the comparator 21.

Since the NMOS transistor M26 is turned off and set in non-conduction state, the capacitor C21 is charged by the drain current id3 of the PMOS transistor M23. The voltage VOSCout of the sawtooth signal OSCout outputted from the oscillating circuit 4 is represented by a sum of a terminal voltage VC21 of the capacitor C21 and a voltage drop VR21 of the resistor R21, as in the following formula (1):

$$VOSCout = VC21 + VR21 = VC21 + r21 \times id3 \quad (1)$$

where r21 denotes the resistance of the resistor R21.

If the terminal voltage VC21 of the capacitor C21 exceeds the reference voltage Vr1, the output signal of the comparator 21 is set to HIGH level. For this reason, the NMOS transistor M26 is turned on and the electric charge of the capacitor C21 is discharged quickly. The common terminal C is connected to the terminal B of the switch SW22, and the reference voltage Vr3 is inputted to the inverted input terminal of the comparator 21.

Since the reference voltage Vr3 is set to the voltage value that is near the ground voltage Vss as mentioned above, the electric charge of the capacitor C21 is completely discharged.

If the terminal voltage VC21 of the capacitor C21 falls to the ground voltage Vss, the output signal of the comparator 21 is again set to LOW level, the charging of the capacitor C21 is started, and the output voltage VOSCout of the oscillating circuit 4 rises again. Such operation will be repeated.

In this manner, the gradient of the sawtooth signal OSCout for voltage falling operation is determined by the drain current id3 and the electrostatic capacity of the capacitor C21, the amplitude of the sawtooth signal OSCout for voltage falling operation is almost equal to the reference voltage Vr1, and the lower limit voltage of the sawtooth signal OSCout for voltage falling operation is set to the voltage drop by the resistor R21, that is, (r21×id3).

At the time of voltage rising operation, the voltage rising signal SS is set to LOW level, and the voltage rising/falling signal SKS is set to HIGH level.

When the voltage rising signal SS is set to LOW level, the NMOS transistor M25 is turned off and set in non-conduction state, which means that the resistor R22 is arranged between the resistor R21 and the capacitor C21.

Since the voltage rising/falling signal SKS remains in HIGH level, the PMOS transistor M24 is turned off and the common terminal C is connected to the terminal B of the switch SW21.

When the output signal of the comparator 21 is set to LOW level in the above-mentioned state, the common terminal C is connected to the terminal A of the switch SW22, and the reference voltage Vr1 is inputted to the inverted input terminal of the comparator 21.

Since the NMOS transistor M26 is turned off and set in non-conduction state, the capacitor C21 is charged by the drain current id3 of the PMOS transistor M23. The output voltage VOSCout of the oscillating circuit 4 is represented by a sum of the terminal voltage VC21 of the capacitor C21, the voltage drop VR21 by the resistor R21, and the voltage drop VR22 by the resistor R22, as in the following formula (2);

$$\begin{aligned} VOSCout &= Vc21 + VR21 + VR22 \\ &= Vc21 + (r21 + r22) \times id3 \end{aligned} \quad (2)$$

where r22 denotes the resistance of the resistor R22.

If the terminal voltage VC21 of the capacitor C21 exceeds the reference voltage Vr1, the output signal of the comparator 21 is set to HIGH level. For this reason, the NMOS transistor M26 is turned on and the electric charge of the capacitor C21 is discharged quickly. The common terminal C is connected to the terminal B of the switch SW22, and the reference voltage Vr3 is inputted to the inverted input terminal of the comparator 21.

Similar to the above-described voltage falling operation, the output signal of the comparator 21 is again set to LOW level, if the terminal voltage VC21 of the capacitor C21 falls to the ground voltage Vss. The charging of the capacitor C21 is started, and the output voltage VOSCout of the oscillating circuit 4 rises again. The above-mentioned operation is repeated.

In this manner, the gradient and the amplitude of the sawtooth signal OSCout at the time of voltage rising operation are the same as those at the time of voltage falling operation, and the lower limit voltage is represented the sum of the voltage drop by the resistor R21 and the voltage drop by the resistor R22, i.e., it is equal to (r21+r22)×id3.

In this embodiment, the lower limit voltage of the sawtooth signal OSCout at the time of voltage rising operation and the upper limit voltage of the sawtooth signal OSCout at the time of voltage falling operation are almost equal to each other. Thus, the resistance of the resistor R22 is set up so that the voltage drop VR22 by the resistor R22 may be equal to the reference voltage Vr1.

At the time of voltage rising/falling operation, the voltage rising signal SS is set to HIGH level, and the voltage rising/falling signal SKS is set to LOW level. When the voltage rising signal SS is set to HIGH level, the NMOS transistor M25 is turned on to short-circuit the resistor R22, similar to that of the time of voltage falling operation.

When the voltage rising/falling signal SKS is set to LOW level, the PMOS transistor M24 is turned on and set in conduction state, and the common terminal C is connected to terminal A of the switch SW21.

When the output signal of the comparator 21 is set to LOW level in the above-mentioned state, the common terminal C is connected to the terminal A of the switch SW22, and the reference voltage Vr2 is inputted to the inverted input terminal of the comparator 21.

Since NMOS transistor M26 is turned off and set in non-conduction state, the capacitor C21 is charged by both the drain current id3 of the PMOS transistor M23 and the drain current id2 of the PMOS transistor M22. The output voltage VOSCout of the oscillating circuit 4 is represented by a sum of the terminal voltage VC21 of the capacitor C21 and the voltage drop VR21 by the resistor R21, as in the following formula (3).

$$VOSCout = VC21 + VR21 = VC21 + r21 \times id3 \qquad (3)$$

The above formula (3) is the same as that at the time of voltage falling operation, but the former differs from the latter in that the rate of increase of the terminal voltage VC21 at the time of voltage rising/falling operation is twice as large as that at the time of voltage falling operation.

If the terminal voltage VC21 of the capacitor C21 exceeds the reference voltage Vr2, the output signal of the comparator 21 is set to HIGH level. For this reason, the NMOS transistor M26 is turned on the electric charge of capacitor C21 is discharged quickly. The common terminal C is connected to the terminal B of the switch SW22, and the reference voltage Vr3 is inputted to the inverted input terminal of the comparator 21.

In this state, if the terminal voltage VC21 of the capacitor C21 falls to the ground voltage Vss, the output signal of the comparator 21 is again set to LOW level. As described above, the charging of the capacitor C21 is started, and the output voltage VOSCout of the oscillating circuit 4 rises again. The above-described operation is repeated.

In this manner, the gradient of the sawtooth signal OSCout for voltage rising/falling operation is twice as large as that for voltage falling operation or voltage rising operation, the amplitude of the sawtooth signal OSCout for voltage rising/falling operation is almost equal to the reference voltage Vr2, and the lower limit voltage of the sawtooth signal OSCout for voltage rising/falling operation is set to the voltage drop by the resistor R21, that is, (r21×id3).

In the above-described embodiment, the amplitude of the sawtooth signal OSCout for voltage rising/falling operation is twice as large as that for voltage falling operation or voltage rising operation, the reference voltage Vr2 is set to be twice as large as the reference voltage Vr1. Since the gradient of the sawtooth signal OSCout for voltage rising/falling operation is twice as large as that for voltage falling operation or voltage rising operation, the time of one cycle for voltage rising/falling operation is the same as that for voltage falling operation or voltage rising operation.

Figure 4:
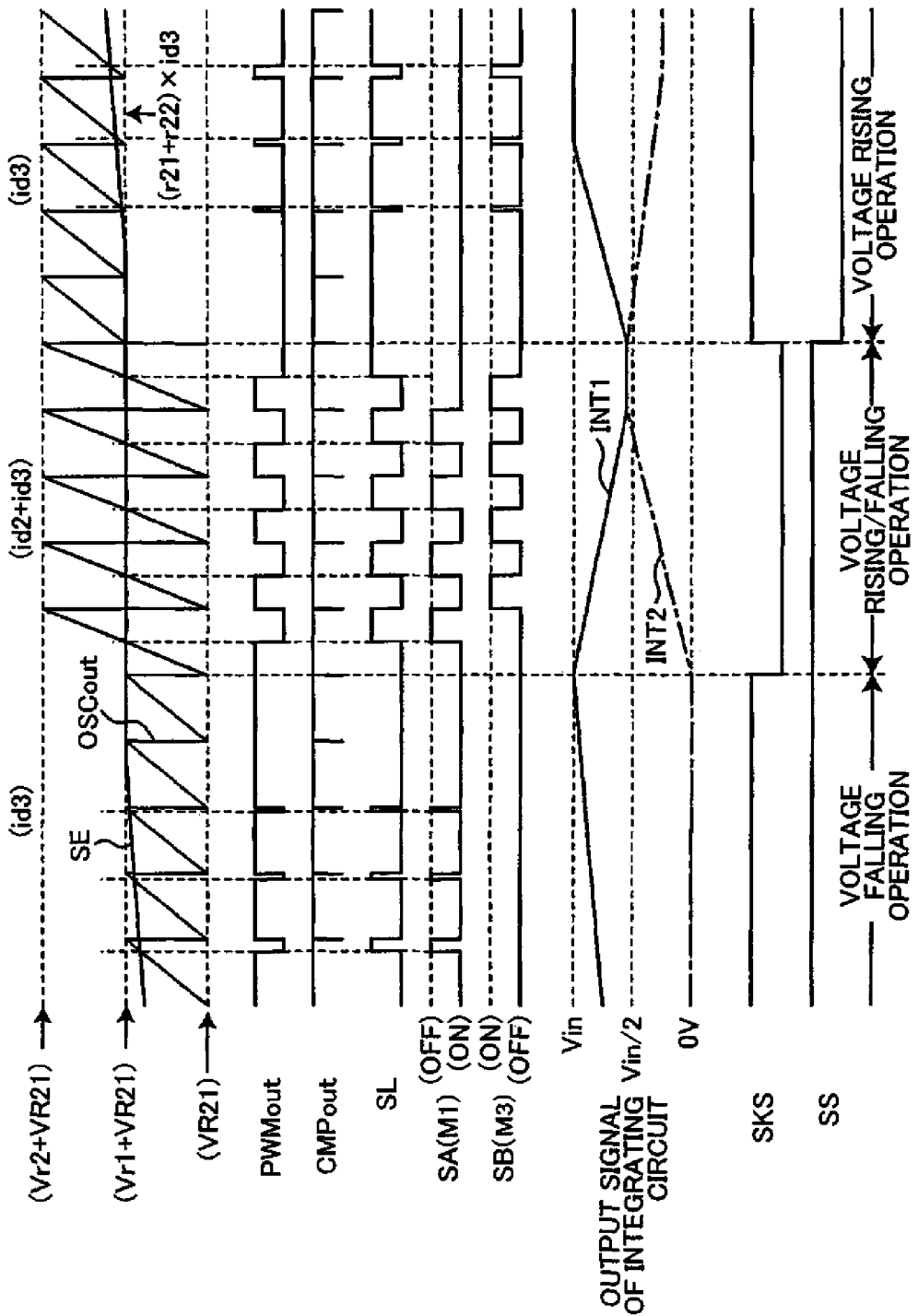
FIG. 4 is a timing chart for explaining operation and waveform of each of the respective parts of the voltage rising/falling type switching regulator shown in FIGS. 1 to 3.
Figure 5:
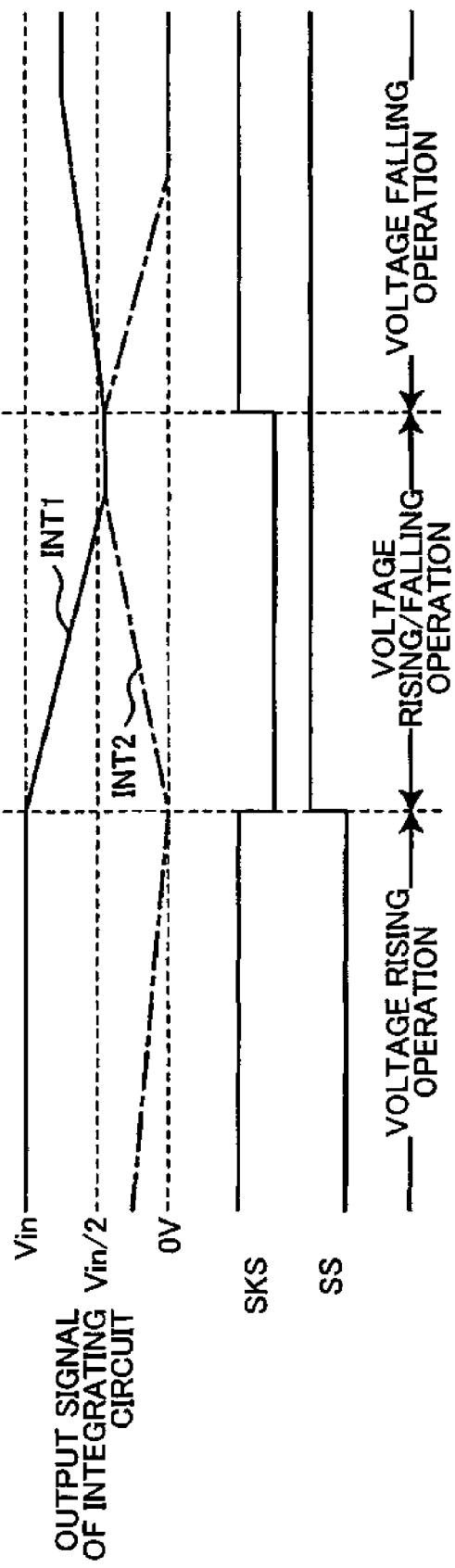
FIG. 5 is a timing chart for explaining waveform of each of the respective parts of the voltage rising/falling type switching regulator 1 shown in FIGS. 1 to 3.
Figure 6:
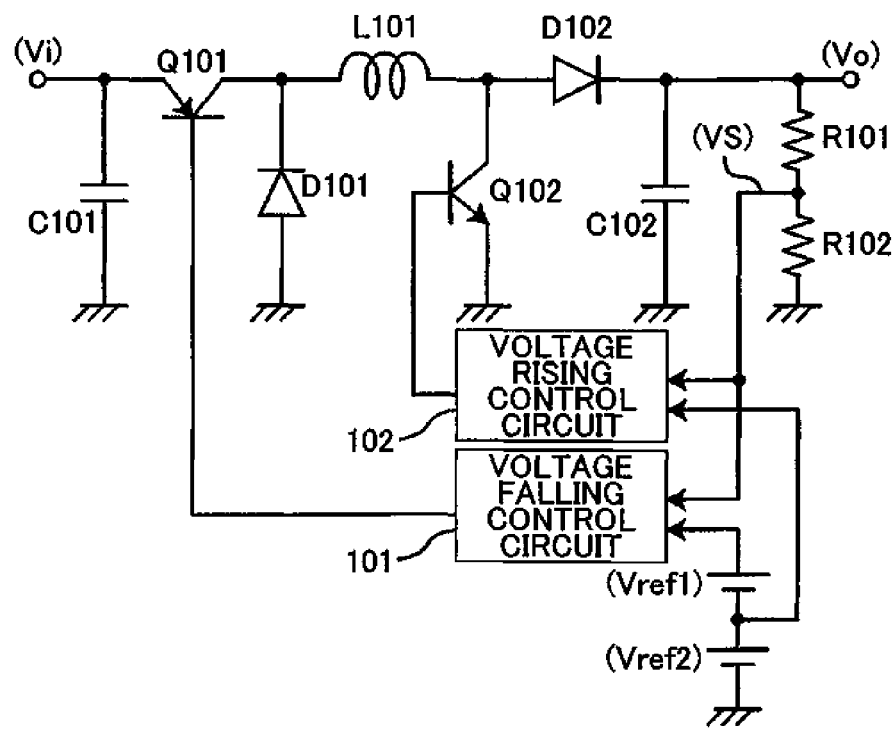
FIG. 6 is a diagram showing the circuit composition of a voltage rising/falling type switching regulator according to the related art.
Figure 7:
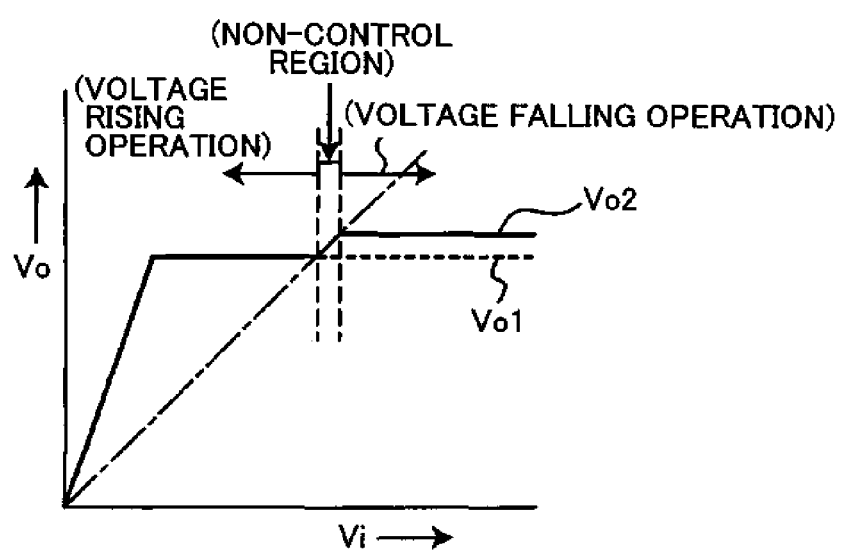
FIG. 7 is a diagram for explaining the relationship between input voltage Vi and output voltage Vo in the voltage rising/falling type switching regulator of FIG. 6.

FIG. 4 and FIG. 5 are timing charts for explaining operation and waveform of each of the respective parts of the voltage rising/falling type switching regulator 1 shown in FIGS. 1-3. A description will be given of operation of the voltage rising/falling type switching regulator 1 with reference to FIG. 4 and FIG. 5.

When the input voltage Vin is larger than the output voltage Vout, as shown in the range of voltage falling operating, the error signal SE from the error amplifying circuit 5 is below the sum voltage (Vr1+VR21) of the reference voltage Vr1 and the voltage drop by the resistor R21. In this state, the error signal SE intersects the sawtooth signal OSCout for voltage falling operation.

The PWM comparator 6 outputs the signal PWMout of LOW level if the voltage VOSCout of the sawtooth signal OSCout for voltage falling operation is larger than the voltage of the error signal SE. If the output signal PWMout of the PWM comparator 6 is set to LOW level, the latch circuit 7 is set and the PWM signal SL is set to HIGH level.

The oscillating circuit 4 outputs the pulse signal CMPout, which is set to LOW level for a predetermined time, to the resetting terminal R of the latch circuit 7 in synchronization with the timing the sawtooth signal OSCout falls from the upper limit voltage to the lower limit voltage. The latch circuit 7 is reset if the pulse signal CMPout of LOW level is inputted, and the PWM signal SL falls to LOW level.

The control circuit 3 outputs the control signal SA to the switching transistor M1 for voltage falling in synchronization with the PWM signal SL from the latch circuit 7. At the time of voltage falling operation, the control circuit 3 sets both the control signal SB to the switching transistor M3 for voltage rising and the control signal SD to the synchronous rectification transistor M4 for voltage rising to LOW level, so that the switching transistor M3 for voltage rising is turned off and set in non-conduction state and the synchronous rectification transistor M4 for voltage rising is turned on and set in conduction state.

If the error signal SE goes up as the input voltage Vin approaches the output voltage Vout and it comes to intersect the upper part voltage of the sawtooth signal OSCout for voltage falling operation, the ON time of the switching transistor M1 for voltage falling becomes long, and its on-duty cycle approaches 100%. For this reason, the voltage of the first integration signal INT1 outputted by the integrating circuit 8 rises, and it becomes close to the input voltage Vin. At this time, since the control signal SB to the switching transistor M3 for voltage rising is set to LOW level, the second integration signal INT2 is equal to 0V.

When the input voltage Vin is equal to the output voltage Vout, the voltage of the error signal SE rises further and the error signal SE does not intersect the sawtooth signal OSCout. For this reason, the on-duty cycle of the switching transistor M1 for voltage falling is equal to 100%, and the voltage of the first integration signal INT1 reaches the input voltage Vin. When it is detected that the voltage of the first integration signal INT1 reached the input voltage Vin, the control circuit 3 sets the voltage rising/falling signal SKS to LOW level.

If the voltage rising/falling signal SKS is set to LOW level in the state where the voltage rising signal SS is set to HIGH level, the oscillating circuit 4 generates and outputs a sawtooth signal OSCout for voltage rising/falling operation, as described above. For this reason, the error signal SE intersects the sawtooth signal OSCout for voltage rising/falling operation in the vicinity of the center of the sawtooth signal OSCout, the on-duty cycle of the switching transistor M1 for voltage falling falls to about 50%. Moreover, at the time of voltage rising/falling operation, the control circuit 3 controls the switching transistor M3 for voltage rising so that the switching transistor M3 for voltage rising also performs on/off operation in synchronization with the switching transistor M1 for voltage falling.

The relationship between the input voltage Vin, the output voltage Vout, and the on-duty cycle of the switching transistor M1 for voltage falling and the switching transistor M3 for voltage rising at the time of voltage rising/falling operation is represented by the following formula (4):

$$Vout = Vin \times D/(1-D) \qquad (4)$$

where D denotes the ratio of an ON time of the switching transistor M1 for voltage falling and the switching transistor M3 for voltage rising in one cycle.

As is apparent from the above formula (4), in the state where the input voltage Vin and the output voltage Vout are equal to each other, the condition D=(1−D) is met (D=0.5), i.e., the on-duty cycle of the switching transistor M1 for voltage falling and the switching transistor M3 for voltage rising is set to 50%. If the on-duty cycle is equal to 50%, both the first integration signal INT1 and the second integration signal INT2 change so that each signal may be set to Vin/2.

After a predetermined period has elapsed from the time of shifting to voltage rising/falling operation, the control circuit 3 checks each voltage of the first integration signal INT1 and the second integration signal INT2. At this time, if the input voltage Vin is smaller than the output voltage Vout, then the condition D>0.5 is met according to the above formula (4). For this reason, the on-duty cycle of the switching transistor M1 for voltage falling and the switching transistor M3 for voltage rising is above 50%, and the voltage of the first integration signal INT1 and the voltage of the second integration signal INT2 are above Vin/2.

When it is detected that the voltage of the first integration signal INT1 and the voltage of the second integration signal INT2 are above Vin/2 and equal to each other, the control circuit 3 sets the voltage rising/falling signal SKS to HIGH level and simultaneously sets the voltage rising signal SS to LOW level, in order to start voltage rising operation.

The predetermined period mentioned above may vary depending on the respective time constants of the resistor R11 and capacitor C11 and the resistor R12 and capacitor C12 included in the integrating circuit 8. It is adequate that the predetermined period is set to be larger than a period from the instant each voltage of the first integration signal INT1 and the second integration signal INT2 is equal to about 0 v or the input voltage Vin to the instant it reaches Vin/2.

If the voltage rising/falling signal SKS is set to HIGH level and the voltage rising signal SS is set to LOW level, the oscillating circuit 4 generates and outputs the sawtooth signal OSCout for voltage rising operation. The error signal SE intersects the sawtooth signal OSCout for voltage rising operation, the oscillating circuit 4, the PWM comparator 6, and the latch circuit 7 respectively perform the operation which is the same as that at the time of voltage falling operation, so that the PWM signal SL is outputted by the latch circuit 7.

The control circuit 3 generates and outputs the control signal SB for controlling switching on/off of the switching transistor M3 for voltage rising, in accordance with the PWM signal SL received from the latch circuit 7. At the time of voltage rising operation, the control circuit 3 sets the control signal SA to control the switching transistor M1 for voltage falling, to LOW level, so that the switching transistor M1 for voltage falling is turned on.

During voltage rising operation, the control signal SA to control the switching transistor M1 for voltage falling is set to LOW level, and the first integration signal INT1 goes up to the input voltage Vin, and the second integration signal INT2 is set to a voltage which is proportional to the on-duty cycle of the control signal SB.

At the time of shifting from voltage rising operation to voltage falling operation, the voltage of the error signal SE falls as the input voltage Vin approaches the output voltage Vout, and the error signal SE intersects the lower part of the sawtooth signal OSCout for voltage rising operation. The ON time of the switching transistor M3 for voltage rising is decreased, and the on-duty cycle approaches 0%. For this reason, as shown in FIG. 5, the voltage of the second integration signal INT2 outputted by the integrating circuit 8 falls and approaches 0V.

Since the control signal SA to control the switching transistor M1 for voltage falling is set to HIGH level, the first integration signal INT1 is set to 0V.

When the input voltage Vin is equal to the output voltage Vout, the voltage of the error signal SE falls further and the error signal SE does not intersect the sawtooth signal OSCout for voltage rising operation. For this reason, the on-duty cycle of the switching transistor M3 for voltage rising is set to 0%, and the voltage of the second integration signal INT2 is set to 0V. When it is detected that each voltage of the first integration signal INT1 and the second integration signal INT2 is equal to 0V, the control circuit 3 sets the voltage rising/falling signal SKS to LOW level and sets the voltage rising signal SS to HIGH level.

If the voltage rising signal SS is set to HIGH level and the voltage rising/falling signal SKS is set to LOW level, the oscillating circuit 4 generates the sawtooth signal OSCout for voltage rising/falling operation as described above. For this reason, the error signal SE intersects the sawtooth signal OSCout for voltage rising/falling operation in the vicinity of the center of the sawtooth signal, and the switching transistor M1 for voltage falling and the switching transistor M3 for voltage rising are synchronized and turned on and off in an about 50% on-duty cycle respectively. This causes the first integration signal INT1 and the second integration signal INT2 to start changing to the voltage Vin/2.

After the predetermined period has elapsed from the instant of shifting to voltage rising/falling operation, the control circuit 3 checks each of the voltage of the first integration signal INT1 and the voltage of the second integration signal INT2. At this time, when the input voltage Vin is larger than the output voltage Vout, the condition D<0.5 is met according to the above formula (1) and the on-duty cycle is below 50%, and each voltage of the first integration signal INT1 and the second integration signal INT2 is below Vin/2, respectively.

When it is detected that each voltage of the first integration signal INT1 and the voltage of the second integration signal INT2 are equal to each other and below Vin/2, the control circuit 3 sets the voltage rising/falling signal SKS to HIGH level and simultaneously sets the voltage rising signal SS to HIGH level, in order to start voltage falling operation. The predetermined period is the same as described above.

In the above-mentioned embodiment, the cases in which voltage rising operation is shifted to voltage falling operation and voltage falling operation is shifted to voltage rising operation have been explained. Alternatively, if the voltage of the first integration voltage INT1 and the voltage of the second integration voltage INT2 are below Vin/2 and equal to each other after the predetermined period has elapsed from the instant of shifting from voltage falling operation to voltage rising/falling operation, the operation of the switching regulator may be returned to voltage falling operation.

On the contrary, if the voltage of the first integration voltage INT1 and the voltage of the second integration voltage INT2 are above Vin/2 and equal to each other after the predetermined period has elapsed from the instant of shifting from voltage rising operation to voltage rising/falling operation, the operation of the switching regulator may be returned to voltage rising operation.

In the above-mentioned embodiment, the control circuit 3 is arranged so that, after the predetermined period has elapsed from the instant of starting voltage rising/falling operation, the operation of the switching regulator is shifted to the following target operation. Alternatively, the control circuit 3 may be arranged so that, if the voltage of the first integration voltage INT1 and the voltage of the second integration voltage INT2 are equal to each other during voltage rising/falling operation, then the operation of the switching regulator is shifted to the following target operation.

As described in the foregoing, the voltage rising/falling type switching regulator of this embodiment is arranged so that, in the middle of shifting between voltage falling operation and voltage rising operation, the switching transistor M1 for voltage falling and the switching transistor M3 for voltage rising are synchronized to perform voltage rising/falling operation in which each switching transistor is turned on and off in an about 50% on-duty cycle. The change in the transforming efficiency at the time of shifting between voltage falling operation and voltage rising operation is reduced, and the fluctuation in the output voltage at the time of voltage falling operation and at the time of voltage rising operation is reduced. Accordingly, without causing the non-control state to occur, it is possible to perform shifting between voltage falling operation and voltage rising operation, and the fluctuation in the output voltage at the time of shifting can be made small.

In the above-described embodiment, the switching regulator of synchronous rectification type has been explained. However, this invention is not limited to such an embodiment. Alternatively, the switching regulator in which either or both of the synchronous rectification transistor M2 for voltage falling and the synchronous rectification transistor M4 for voltage rising are replaced by rectifier diodes may be provided.

In the above-mentioned embodiment, the oscillating circuit 4 generates a sawtooth signal and outputs the same. This invention is not limited to this embodiment. Alternatively, the switching regulator may be arranged so that the oscillating circuit 4 generates and outputs a triangular wave signal other than a sawtooth signal.

The present invention is not limited to the above-described embodiments, and variations and modifications may be made without departing from the scope of the present invention.

The present application is based on and claims the benefit of priority of Japanese patent application No. 2006-314289, filed on Nov. 21, 2006, the entire contents of which are hereby incorporated by reference.

What is claimed is:

1. A voltage rising/falling type switching regulator including
a voltage rising/falling part lowering or raising an input voltage inputted from an input terminal in accordance with an inputted control signal, using an inductor, to output the resulting voltage from an output terminal, and
a control part causing the voltage rising/falling part to perform voltage rising operation or voltage falling operation in response to a voltage difference between a proportional voltage which is proportional to the output voltage received from the voltage rising/falling part, and a predetermined reference voltage,
the voltage rising/falling part comprising:
a switching transistor for voltage falling which is turned on and off according to the inputted control signal to charge the inductor by the input voltage during voltage falling operation;
a rectifier element for voltage falling which discharges the inductor during voltage falling operation;
a switching transistor for voltage rising which is turned on and off according to the inputted control signal to charge the inductor by the input voltage during voltage rising operation; and
a rectifier element for voltage rising which discharges the inductor during voltage rising operation,
wherein the control part is arranged so that the switching transistor for voltage rising and the switching transistor for voltage falling are synchronized at a time of shifting from voltage rising operation to voltage falling operation and/or at a time of shifting from voltage falling operation to voltage rising operation, to perform voltage rising/falling operation in which each switching transistor is turned on in a 50% duty cycle, the control part comprising:
an error amplifying circuit part amplifying the voltage difference between the proportional voltage and the reference voltage to output an output signal indicating the amplified voltage difference;
an oscillating circuit part generating one of a triangular wave signal for voltage falling operation, a triangular wave signal for voltage rising operation, and a triangular wave signal for voltage rising/falling operation in response to the inputted control signal;
a voltage comparing circuit part performing a voltage comparison of the output signal received from the error amplifying circuit part and the triangular wave signal received from the oscillating circuit part to output a binary signal indicating the comparison result;
an output control circuit part controlling switching of the switching transistor for voltage falling and the switching transistor for voltage rising, in accordance with the binary signal received from the voltage comparing circuit part; and
an integrating circuit part integrating a control signal outputted to a control electrode of the switching transistor for voltage falling by the output control circuit part, to generate a first integration signal, and integrating a control signal outputted to a control electrode of the switching transistor for voltage rising by the output control circuit part, to generate a second integration signal, the integrating circuit part outputting the first integration signal and the second integration signal to the output control circuit part, respectively,
wherein the output control circuit part is arranged to cause the oscillating circuit part to generate a predetermined triangular wave signal according to operation, thereby causing the voltage rising/falling part to perform one of voltage falling operation, voltage rising operation, and voltage rising/falling operation, and
wherein the output control circuit part is arranged to cause the oscillating circuit part to output one of the triangular wave signal for voltage falling operation, the triangular wave signal for voltage rising operation, and the triangular wave signal for voltage rising/falling operation in accordance with the first integration signal and the second integration signal received from the integrating part.

2. The voltage rising/falling type switching regulator according to claim 1, wherein the oscillating circuit part is arranged so that an amplitude of the triangular wave signal for voltage falling operation is larger than an amplitude of the triangular wave signal for voltage rising operation, an upper limit voltage of the triangular wave signal for voltage falling operation and a lower limit voltage of the triangular wave signal for voltage rising operation are equal to each other, a lower limit voltage of the triangular wave signal for voltage rising/falling operation and a lower limit voltage of the triangular wave signal for voltage falling operation are equal to each other, an upper limit voltage of the triangular wave signal for voltage rising/falling operation and an upper limit voltage of the triangular wave signal for voltage rising operation are equal to each other, and each of the triangular wave signal for voltage falling operation, the triangular wave signal for voltage rising operation, and the triangular wave signal for voltage rising/falling operation has a same period.

3. The voltage rising/falling type switching regulator according to claim 1, wherein, when it is detected from the first integration signal that an on-duty cycle of the switching transistor for voltage falling is 100%, the output control circuit part causes the voltage rising/falling part to perform the voltage rising/falling operation.

4. The voltage rising/falling type switching regulator according to claim 1, wherein, when it is detected from the second integration signal that an on-duty cycle of the switching transistor for voltage rising is 0%, the output control circuit part causes the voltage rising/falling part to perform the voltage rising/falling operation.

5. The voltage rising/falling type switching regulator according to claim 1, wherein, after a predetermined period has elapsed from a time the voltage rising/falling part is caused to start the voltage rising/falling operation, the output control circuit part causes the voltage rising/falling part to terminate the voltage rising/falling operation and perform a following operation.

6. The voltage rising/falling type switching regulator according to claim 1, wherein, when it is detected that voltages of the first integration signal and the second integration signal received from the integrating circuit part are equal to each other, the output control circuit part causes the voltage rising/falling part to terminate the voltage rising/falling operation and perform a following operation.

7. The voltage rising/falling type switching regulator according to claim 1, wherein each triangular wave signal is a sawtooth signal.

8. The voltage rising/falling type switching regulator according to claim 1, wherein the switching transistor for voltage falling, the rectifier element for voltage falling, the switching transistor for voltage rising, the rectifier element for voltage rising, and the control part are integrated on a single IC.

9. The voltage rising/falling type switching regulator according to claim 6, wherein, when it is detected from the first integration signal and the second integration signal, received from the integrating circuit part, that an on-duty cycle of each of the control signal inputted to the control electrode of the switching transistor for voltage falling and the control signal inputted to the control electrode of the switching transistor for voltage rising is above 50% respectively, the output control circuit part causes the voltage rising/falling part to perform the voltage rising operation.

10. The voltage rising/falling type switching regulator according to claim 6, wherein, when it is detected from the first integration signal and the second integration signal, received from the integrating circuit part, that an on-duty cycle of each of the control signal inputted to the control electrode of the switching transistor for voltage falling and the control signal inputted to the control electrode of the switching transistor for voltage rising is below 50% respectively, the output control circuit part causes the voltage rising/falling part to perform the voltage falling operation.

11. An operation control method of a voltage rising/falling type switching regulator, the voltage rising/falling type switching regulator including:
a voltage rising/falling part lowering or raising an input voltage inputted from an input terminal in accordance with an inputted control signal, using an inductor, to output the resulting voltage from an output terminal, and
a control part causing the voltage rising/falling part to perform voltage rising operation or voltage falling operating in response to a voltage difference between a proportional voltage which is proportional to the output voltage received from the voltage rising/falling part, and a predetermined reference voltage, the voltage rising/falling part comprising:
a switching transistor for voltage falling which is turned on and off according to the inputted control signal to charge the inductor by the input voltage during voltage falling operation;
a rectifier element for voltage falling which discharges the inductor during voltage falling operation;
a switching transistor for voltage rising which is turned on and off according to the inputted control signal to charge the inductor by the input voltage during voltage rising operation; and
a rectifier element for voltage rising which discharges the inductor during voltage rising operation,
wherein the control part is arranged so that the switching transistor for voltage rising and the switching transistor for voltage falling are synchronized at a time of shifting from voltage rising operation to voltage falling operation and/or at a time of shifting from voltage falling operation to voltage rising operation, to perform voltage rising/falling operation in which each switching transistor is turned on in a 50% duty cycle, the operation control method comprising:
amplifying, by an error amplifying circuit part of the control part, the voltage difference between the proportional voltage and the reference voltage to output an output signal indicating the amplified voltage difference;
generating, by an oscillating circuit part of the control part, one of a triangular wave signal for voltage falling operation, a triangular wave signal for voltage rising operation, and a triangular wave signal for voltage rising/falling operation in response to the inputted control signal;
performing, by a voltage comparing circuit part of the control part, a voltage comparison of the output signal received from the error amplifying circuit part and the triangular wave signal received from the oscillating circuit part, to output a binary signal indicating the comparison result;
controlling, by an output control circuit part of the control part, switching of the switching transistor for voltage falling and the switching transistor for voltage rising, in accordance with the binary signal received from the voltage comparing circuit part;
integrating, by an integrating circuit part of the control part, a control signal outputted to a control electrode of the switching transistor for voltage falling by the output control circuit part, to generate a first integration signal;
integrating, by the integrating circuit part, a control signal outputted to a control electrode of the switching transistor for voltage rising by the output control circuit part, to generate a second integration signal; and
outputting, by the integrating circuit part, the first integration signal and the second integration signal to the output control circuit part, respectively,
wherein the output control circuit part is arranged to cause the oscillating circuit part to generate a predetermined triangular wave signal according to operation, thereby causing the voltage rising/falling part to perform one of voltage falling operation, voltage rising operation, and voltage rising/falling operation,
wherein the output control circuit part is arranged to cause the oscillating circuit part to output one of the triangular wave signal for voltage falling operation, the triangular wave signal for voltage rising operation, and the triangular wave signal for voltage rising/falling operation in accordance with the first integration signal and the second integration signal received from the integrating circuit part.

12. The operation control method according to claim 11, wherein an amplitude of the triangular wave signal for voltage falling operation is larger than an amplitude of the triangular wave signal for voltage rising operation, an upper limit voltage of the triangular wave signal for voltage falling operation and a lower limit voltage of the triangular wave signal for voltage rising operation are equal to each other, a lower limit voltage of the triangular wave signal for voltage rising/falling operation and a lower limit voltage of the triangular wave signal for voltage falling operation are equal to each other, an upper limit voltage of the triangular wave signal for voltage rising/falling operation and an upper limit voltage of the triangular wave signal for voltage rising operation are equal to each other, and each of the triangular wave signal for voltage falling operation, the triangular wave signal for voltage rising operation, and the triangular wave signal for voltage rising/falling operation has a same period.

13. The operation control method according to claim 11, wherein, when it is detected from the first integration signal that an on-duty cycle of the switching transistor for voltage falling is 100%, the voltage rising/falling operation is performed.

14. The operation control method according to claim 11, wherein, when it is detected from the second integration signal that an on-duty cycle of the switching transistor for voltage rising is 0%, the voltage rising/falling operation is performed.

15. The operation control method according to claim 11, wherein, after a predetermined period has elapsed from a time the voltage rising/falling operation is started, the voltage rising/falling operation is terminated and a following operation is performed.

16. The operation control method according to claim 11, wherein, when it is detected that voltages of the first integration signal and the second integration signal are equal to each other, the voltage rising/falling operation is terminated and a following operation is performed.

17. The operation control method according to claim 11, wherein each triangular wave signal is a sawtooth signal.

18. The operation control method according to claim 16, wherein, when it is detected from the first integration signal and the second integration signal that an on-duty cycle of each of the control signal inputted to the control electrode of the switching transistor for voltage falling and the control signal inputted to the control electrode of the switching transistor for voltage rising is above 50% respectively, the voltage rising operation is performed.

19. The operation control method according to claim 16, wherein, when it is detected from the first integration signal and the second integration signal that an on-duty cycle of each of the control signal inputted to the control electrode of the switching transistor for voltage falling and the control signal inputted to the control electrode of the switching transistor for voltage rising is below 50% respectively, the voltage falling operation is performed.

* * * * *